United States Patent Office 3,470,132
Patented Sept. 30, 1969

3,470,132
THERMOCURABLE COMPOSITION OF EPOXY RESINS AND MIXED POLYCARBOXYLIC ACID ANHYDRIDES
Otto Ernst, Pfeffingen, Switzerland, Kurt Neubold, Bottrop, and Guenther Ibing, Gladbeck, Germany, and Fritz Kugler, Muttenz, Switzerland, assignors to Ciba Limited, Basel, Switzerland, a company of Switzerland, and Ruhroel Chemiewerk der Steinkohlenbergwerke Mathias Stinnes Aktiengesellschaft, Bottrop, Germany, a German body corporate
No Drawing. Filed Nov. 29, 1966, Ser. No. 597,577
Claims priority, application Switzerland, Dec. 10, 1965, 17,088/65; Sept. 26, 1966, 13,852/66
Int. Cl. C08g 30/32
U.S. Cl. 260—47     4 Claims

ABSTRACT OF THE DISCLOSURE

Thermocurable mixtures containing epoxy resins having a plurality of 1,2-epoxide groups and as curing agents polycarboxylic acid anhydrides characterized in that the curing agent consists at least partially of an anhydride mixture which is liquid at room temperature and has been obtained by isomerizing a methyl-tetrahydrophthalic anhydride especially 4-methyl-$\Delta^4$-tetrahydrophthalic anhydride, in known manner.

---

The present invention provides new, thermocurable mixtures containing epoxy resins and as curing agents polycarboxylic acid anhydrides, characterized in that the curing agent consists at least partially of an anhydride mixture which is liquid at room temperature and has been obtained by isomerizing a methyl-tetrahydrophthalic anhydride, especially 4-methyl-$\Delta^4$-tetrahydrophthalic anhydride, in known manner.

The anhydride mixtures used as curing agents according to this invention are colourless or yellowish liquids which are of low viscosity at room temperature. They are prepared in known manner by isomerizing a methyl-tetrahydrophthalic anhydride at an elevated temperature and in the presence of a suitable catalyst, such as finely disperse metallic palladium or ruthenium (see U.S. specification No. 2,764,597, patented Sept. 25, 1956 to E. I. Du Pont de Nemours and Company, Wilmington, Del., a corporation of Delaware) or of a catalytic amount of phosphoric acid or sulphhuric acid or of an acid salt of these acids, acid halides or acid anhydrides (see U.S. specification No. 2,959,599, patented Nov. 8, 1960 to Allied Chemical Corporation, a corporation of New York). For example, on isomerization of 4-methyl-$\Delta^4$-tetrahydrophthalic anhydride there are obtained isomer mixtures containing as the principal constituents 4-methyl-$\Delta^3$-tetrahydrophthalic anhydride, 4-methyl-$\Delta^1$-tetrahydrophthalic anhydride and 4-methyl-$\Delta^2$-tetrahydrophthalic anhydride, and in addition varying proportions of more highly unsaturated and less highly unsaturated products formed by disproportioning, that is to say 4-methylphthalic anhydride and 4-methyl-hexahydrophthalic anhydride respectively, as well as minor shares of unidentified rearrangement products. The proportional shares of the individual isomers in the mixture may vary within rather wide limits according to the reaction temperature, the reaction time and the kind and activity of the catalyst employed.

By virtue of their low-viscous consistency the present isomers mixtures are particularly suitable for the manufacture of casting and impregnating resin mixtures based on epoxy resins. Compared with the known polycarboxylic acid anhydrides or mixtures of such anhydrides, which are liquid at room temperature, especially the 4-methyl-hexahydrophthalic anhydride proposed as curing agent for epoxy resins in German Auslegeschrift No. 1,191,967, the isomerized anhydride mixtures are distinguished above all by their much lesser sensitivity to atmospheric moisture. In the case of the isomerized anhydride mixtures turbidity, due to crystallization of the dicarboxylic acid formed, sets in only after a much longer period of storage than with 4-methyl-hexahydrophthalic anhydride.

The lesser sensitivity to atmospheric moisture is not only an advantage in storing the products but more especially also in the handling of curable mixtures of epoxy resins with anhydride curing agents.

An especially good shelf life is observed with isomer mixtures having a substantial content, that is to say more than 1% and preferably from 30 to 45% by weight, of 4-methyl-$\Delta^1$-tetrahydrophthalic anhydride. It is also advantageous for the isomer mixture to have a sufficiently large content of disproportionation products, that is to say at least 10% and preferably from 15 to 35% by weight of 4-methyl-hexahydrophthalic anhydride and of at least 5%, preferably from 7 to 18% by weight, of 4-methyl-phthalic anhydride. Such isomer mixtures are obtained as a rule by using potent isomerizing catalysts, such as a palladium or ruthenium catalyst, and working at a high isomerizing temperature. When milder isomerizing conditions and less potent catalysts are used, for example oxygen acids such as phosphoric acid, or an anhydride thereof, there are obtained isomer mixtures containing only 1% or less of 4-methyl-$\Delta^1$-tetrahydrophthalic anhydride and a correspondingly higher share of the $\Delta^2$ and $\Delta^3$ isomers. Likewise, isomer mixtures manufactured unders such mild conditions have only a very low content of disproportionation products. Isomer mixtures prepared under such mild conditions may be used for the purpose of the present invention, but undesirable crystallization occurs with such mixtures, especially during storage, sooner or later.

While it is known from British specification No. 914,463 to use as curing agents for epoxy resins isomer mixtures that are liquid at room temperature and have been obtained by isomerizing unsubstituted tetrahydrophthalic anhydride in the presence of an acid catalyst; such isomer mixtures previously known as curing agents for epoxy resins likewise have the disadvantage of being sensitive to atmospheric moisture and of rapidly turning turbid owing to crystallization during storage or handling. It was therefore especially surprising that isomer mixtures, which have been obtained by isomerizing methyl-substituted tetrahydrophthalic acids, do not have this disadvantage.

By mixing the isomerized anhydride mixtures of this invention with other polycarboxylic acid anhydrides that are solid at room temperature, for example, methyl-tetrahydrophthalic anhydride or hexahydrophthalic anhydride, there may be prepared eutectic curing agent mixtures which are liquid at room temperature and possess valuable technical properties. Thus, the liquid isomer mixtures of this invention are more suitable than the known, liquid methyl-hexahydrophthalic anhydride for liquefying both hexahydrophthalic anhydride and pure, solid 4-methyl-$\Delta^4$-tetrahydrophthalic anhydride; this, too, is due to the better stability towards hydrolysis by atmospheric moisture.

Mixtures of the new isomerized anhydride mixtures and 4-methyl-$\Delta^4$-tetrahydrophthalic anhydride, when used as curing agents for epoxy resins, further have the advantage over mixtures of 4-methyl-hexahydrophthalic anhydride and 4-methyl-$\Delta^4$-tetrahydrophthalic anhydride that the cured castings have a higher heat distortion point according to Martens (DIN). It is another advantage of the new, liquid isomer mixtures over the 4-methyl-hexahydrophthalic anhydride known as curing agent for epoxy resins that the pot life of the epoxy resin+curing agent mixture at 25° C., containing as curing agent the isomerized anhydride mixtures of this invention, is longer than when the curing agent used is 4-methyl-hexahydrophthalic anhydride.

As epoxy resins that can be cured with the new anhydride mixtures of this invention there may be mentioned, for example:

Di- or polyglycidyl ethers of dialcohols or polyalcohols, such as 1,4-butandiol or glycerol, or of diphenols or polyphenols such as resorcinol, bis(4-hydroxyphenyl) dimethylmethane or condensation products of formaldehyde with phenols (novolaks); polyglycidyl esters of polycarboxylic acids, such as phthalic or terephthalic acid; triglycidyl esters of cyanuric acid and isocyanuric acid; amino-polyepoxides, for example, those obtained by dehydrohalogenating reaction products of an epihalohydrin with a primary or secondary amine, such as n-butylamine, aniline or 4,4'-di-(monomethylamino)-diphenylmethane; furthermore epoxidized, poly-unsaturated compounds such as epoxidized polybutadienes ("oxirones"), vinylcyclohexene dioxide, limonen dioxide, dicyclopentadiene dioxide, bis(3,4-epoxy-cyclohexylmethyl)phthalate, diethyleneglycol-bis(3,4-epoxy - cyclohexane carboxylate), 3,4 - epoxy - 6 - methylcyclohexylmethyl - 3,4 - epoxy - 6 - methylcyclohexane carboxylate, 3,4-epoxy-hexahydrobenzal-3,4-epoxy-cyclohexane-1,1-dimethanol and ethyleneglycol - bis(3,4 - epoxy tetrahydro - dicyclopentadien-8-yl) ether.

The new isomerized anhydride mixtures may be used either as such or in admixture with other di- or polycarboxylic acid anhydrides, for example, phthalic anhydride, methyl-endomethylene-tetrahydrophthalic anhydride, allylsuccinic anhydride, dodecenylsuccinic anhydride, hexahydrophthalic anhydride, hexachloro-endomethylene-tetrahydrophthalic anhydride, endomethylenetetrahydrophthalic anhydride, maleic anhydride, succinic anhydride or pyromellitic dianhydride, and advantageously, if desired, also in admixture with accelerators, such as tertiary amines or sodium alcoholates.

The curable mixtures of this invention may further contain plasticizers such as dibutylphthalate, dioctylphthalate or tricresylphosphate, inert diluents or so-called active diluents, especially monoepoxides, for example, butylglycide or cresylglycide.

Furthermore, there may be added to the new curable mixtures at any stage prior to the curing operation other conventional additives such as fillers, dyestuffs, pigments, flame-inhibitors, mould lubricants and the like. Suitable extenders and fillers are, for example, asphalt, bitumen, glass fibers, mica, quartz meal, cellulose, kaolin, ground dolomite, colloidal silica having a large surface (Aerosil) or metal powders, such as aluminum powder.

The curable mixtures of this invention may be used in the filled or unfilled state, if desired in the form of solutions or emulsions, as laminating resins, paints, lacquers, sinter powders, dipping resins, casting resins, moulding compositions, sealing compounds, putties, floor coverings, potting and insulating compounds for the electrical industry, as adhesives and the like, as well as in the manufacture of such products.

Parts and percentages in the following examples are by weight. The relationship between part by weight and part by volume is the same as that between the kilogram and the litre.

EXAMPLE 1

1000 parts of a polyglycidyl ether resin [prepared by reacting 2,2-(para,para'-dihydroxydiphenyl)propane with epichlorohydrin in the presence of alkali; containing 5.3 epoxide equivalents per kg.; viscosity 10,000 centipoises at 25° C.] are mixed at 80° C. with 18 parts of N,N-dimethylbenzylamine and 0.95 anhydride group equivalent each of the anhydride curing mixtures I to IV shown in the following Table I for every 1 equivalent of epoxide groups of the polyglycidyl ether resin. The mixtures are poured into aluminum moulds (40 x 10 x 140 mm.), gelled for 4 hours at 80° C. and then cured for 24 hours at 120° C. Then the mechanical strength properties of the resulting castings are measured.

TABLE 1—COMPOSITION OF CURING MIXTURE IN MOL PERCENT

| Curing mixture | I | II | III | IV |
|---|---|---|---|---|
| Anhydride mixture prepared by isomerizing 4-methyl-$\Delta^4$-tetrahydrophthalic anhydride | 50 | | 75 | |
| 4-methyl-hexahydrophthalic anhydride | | 50 | | 75 |
| 4-methyl-$\Delta^4$-tetrahydrophthalic anhydride, pure | 50 | 50 | 25 | 25 |

TABLE 2—PROPERTIES OF THE CASTINGS

| Curing mixture | I | II | III | IV |
|---|---|---|---|---|
| Heat distortion point according to Martens (DIN), in °C | 91 | 84 | 93 | 1 87 |
| Flexural strength, VSM, in kg./mm.$^2$ | 9.95 | 12.06 | 12.4 | 11.8 |
| Deflection on fracture, in mm | 7.1 | 7.3 | 9.7 | 8.0 |
| Impact strength, VSM, in cmkg./cm.$^2$ | 7.9 | 6.5 | 5.5 | 5.5 |
| Water absorption, 100° C., 1 hour, in percent | 0.35 | 0.38 | 0.31 | 0.36 |

The anhydride mixture formed by isomerizing 4-methyl-$\Delta^4$-tetrahydrophthalic anhydride was prepared thus:

400 parts of 4-methyl-$\Delta^4$-tetrahydrophthalic anhydride (melting at 65 to 66° C.; obtained in known manner by diene synthesis from maleic anhydride and isoprene) are melted and heated to 210° C. Then 0.5% of palladium black is added and the whole is heated for 8 hours at 210° C., then the catalyst is filtered off. There is obtained an anhydride mixture which is liquid at room temperature; it is yellowish and requires no further processing. The palladium catalyst may be used again in subsequent experiments, and it is immaterial whether it is added at the reaction temperature or during the melting. The reaction time and the reaction temperatures may be varied within wide limits.

Gas-chromatographic analysis revealed the following composition:

|  | Percent |
|---|---|
| 4-methyl-$\Delta^1$-tetrahydrophthalic anhydride | 43.2 |
| 4-methyl-hexahydrophthalic anhydride | 29.1 |
| 4-methyl-phthalic anhydride | 16.8 |
| Mixture of 4-methyl-$\Delta^4$-cis- and trans-tetrahydrophthalic anhydrides | 2.8 |
| Fraction consisting mainly of 4-methyl-$\Delta^2$- and 4-methyl-$\Delta^3$-tetrahydrophthalic anhydride | 7.4 |
| Unidentifiable residual fractions | 0.7 |

Castings having similar properties are obtained when the isomer mixture described above is replaced by an isomer mixture prepared as described above with a palladium black catalyst and a somewhat different reaction time and reaction temperature, whose composition is revealed by gas-chromatography to be as follows:

|  | Percent |
|---|---|
| 4-methyl-$\Delta^1$-tetrahydrophthalic anhydride | 37.8 |
| 4-methyl-hexahydrophthalic anhydride | 17.6 |
| 4-methyl-phthalic anhydride | 8.6 |
| Mixture of 4-methyl-$\Delta^4$-cis- and trans-tetrahydrophthalic anhydrides | 10.2 |
| Fraction consisting mainly of 4-methyl-$\Delta^2$- and 4-methyl-$\Delta^3$-tetrahydrophthalic anhydrides | 24.6 |
| Unidentifiable residual fractions | 1.2 |

EXAMPLE 2

15 grams each of the anhydride mixture used in Example 1, prepared by isomerization of 4-methyl-$\Delta^4$-tetrahydrophthalic anhydride, 4-methyl-hexahydrophthalic anhydride and of curing mixtures consisting of 50 mol percent of hexahydrophthalic anhydride and 50 mol percent of the anhydride isomer mixture used in Example 1 and 4-methyl-hexahydrophthalic anhydride respectively, and mixtures of 50 mol percent of pure 4-methyl-$\Delta^4$-tetrahydrophthalic anhydride with 50 mol percent of the anhydride isomer mixture used in Example 1 and 50 mol percent 4-methyl-hexahydrophthalic anhydride respectively, and mixtures of 25 mol percent of pure 4-methyl-$\Delta^4$-tetrahydrophthalic anhydride and 75 mol percent of the anhydride isomer mixture used in Example 1 and of 4-methyl-hexahydrophthalic anhydride respectively, are stored in crystallization dishes of 6 cm. diameter at 20° C. and 65% of relative atmospheric humidity. As can be seen from the following table, the anhydride isomer mixture according to this invention is much less sensitive to moisture than 4-methyl-hexahydrophthalic anhydride. In addition, for the same reason, it is much better suitable for liquefying solid hexahydrophthalic anhydride and solid 4-methyl-$\Delta^4$-tetrahydrophthalic anhydride.

What is claimed is:

1. A thermocurable composition of matter comprising an epoxy resin containing a plurality of 1,2-epoxide groups and a polycarboxylic acid anhydride curing agent, said curing agent essentially consisting of a carboxylic polycarboxylic acid anhydride mixture which is liquid at 25° C. and which has been prepared by catalytic isomerization of melted 4-methyl-$\Delta^4$-tetrahydrophthalic anhydride at an elevated temperature in the presence of a catalyst from the group consisting of palladium catalyst and ruthenium catalyst.

2. A composition according to claim 1, wherein the anhydride mixture prepared by isomerization of 4-methyl-$\Delta^4$-tetrahydrophthalic anhydride contains more than 1% by weight of 4-methyl-$\Delta^1$-tetrahydrophthalic anhydride.

TABLE 3

| Curing mixture | I | II | III | IV | V | VI | VII | VIII |
|---|---|---|---|---|---|---|---|---|
| Isomeric anhydride mixture | 50 |  | 75 |  | 100 |  | 50 |  |
| 4-methyl-hexahydrophthalic anhydride |  | 50 |  | 75 |  | 100 |  | 50 |
| Hexahydrophthalic anhydride |  |  |  |  |  |  | 50 | 50 |
| 4-methyl-$\Delta^4$-tetrahydrophthalic anhydride, pure | 50 | 50 | 25 | 25 |  |  |  |  |
| Slightly turbidity appears after ... hours | 3 | 1 | 7 | 4 | 12 | 4½ | 5 | 3 |

EXAMPLE 3

In a first test 1000 parts of a polyglycidyl ether resin [prepared by reacting 2,2-(para-para'-dihydroxydiphenyl) propane with epichlorhydrin in the presence of alkali; containing 5.3 epoxide equivalents per kg.; viscosity 10,000 centipoises at 25° C.) are mixed with 15 parts of benzyldimethylamine and 800 parts of 4-methyl-hexahydrophthalic anhydride. In a second test 1000 parts of the polyglycidyl ether resin described above are mixed at 25° C. with 15 parts of benzyldimethylamine and 793 parts of the anhydride isomer mixture used in Example 1. Test specimen 1 had a pot life of 3 hours at 25° C. (measured up to 2000 centipoises), whereas specimen 2 had a pot life of 4 hours and 50 minutes. The two mixtures containing epoxy resin, accelerator and curing agent, are poured into aluminum moulds (40 x 10 x 140 mm.), gelled for 3 hours at 70° C. and then cured for 6 hours at 120° C. The mechanical strength properties of the specimen 2 according to this invention are slightly better than those of the reference specimen.

|  | Specimen 1 | Specimen 2 |
|---|---|---|
| Pot life at 25° C., in minutes, up to 2,000 centipoises | 180 | 290 |
| Flexural strength, VSM, in kg./mm.² | 6.5 | 8.9 |
| Deflection on fracture, in mm | 2.7 | 6.0 |
| Impact strenght, in cmkg./cm.² | 3.5 | 5.7 |

3. A composition according to claim 2, wherein the anhydride mixture prepared by isomerization of 4-methyl-$\Delta^4$-tetrahydrophthalic anhydride has a content, formed by disproportionation, of at least 10% by weight of 4-methyl-hexahydrophthalic anhydride and of at least 5% by weight of 4-methylphthalic anhydride.

4. A composition according to claim 2, which contains 30% to 45% by weight of 4-methyl-$\Delta^1$-tetrahydrophthalic anhydride.

References Cited

UNITED STATES PATENTS 2,935,488  5/1960  Phillips et al.
3,296,202  1/1967  Schmitz-Josten et al.

FOREIGN PATENTS 914,463  1/1963  Great Britain.

WILLIAM H. SHORT, Primary Examiner

T. PERTILLA, Assistant Examiner

U.S. Cl. X.R.

161—184; 260—31.8, 37, 30.6, 59, 77.5, 78.4